(12) United States Patent
Nagaoka et al.

(10) Patent No.: US 10,753,245 B2
(45) Date of Patent: Aug. 25, 2020

(54) EXHAUST GAS PURIFICATION SYSTEM FOR INTERNAL COMBUSTION ENGINE, INTERNAL COMBUSTION ENGINE, AND EXHAUST GAS PURIFICATION METHOD FOR INTERNAL COMBUSTION ENGINE

(71) Applicant: ISUZU MOTORS LIMITED, Tokyo (JP)

(72) Inventors: Daiji Nagaoka, Kamakura (JP); Teruo Nakada, Yokohama (JP); Takayuki Sakamoto, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 121 days.

(21) Appl. No.: 15/551,373

(22) PCT Filed: Feb. 1, 2016

(86) PCT No.: PCT/JP2016/052906
§ 371 (c)(1),
(2) Date: Aug. 16, 2017

(87) PCT Pub. No.: WO2016/132874
PCT Pub. Date: Aug. 25, 2016

(65) Prior Publication Data
US 2018/0038250 A1    Feb. 8, 2018

(30) Foreign Application Priority Data
Feb. 16, 2015   (JP) .................................. 2015-027554

(51) Int. Cl.
*F01N 3/025*    (2006.01)
*F01N 3/36*    (2006.01)
(Continued)

(52) U.S. Cl.
CPC ........... *F01N 3/0253* (2013.01); *F01N 3/031* (2013.01); *F01N 3/035* (2013.01); *F01N 3/08* (2013.01);
(Continued)

(58) Field of Classification Search
CPC ........... F01N 2560/026; F01N 2900/04; F01N 2900/0412; F01N 2900/08;
(Continued)

(56) References Cited

U.S. PATENT DOCUMENTS

2004/0016227 A1    1/2004   Kitahara
2007/0056266 A1*   3/2007   Kurtz ...................... F01N 3/025
                                                                60/279
(Continued)

FOREIGN PATENT DOCUMENTS

JP    2002-81335 A    3/2002
JP    2003-65116 A    3/2003
(Continued)

OTHER PUBLICATIONS

English translation of JP2013253578 (Year: 2013).*
(Continued)

*Primary Examiner* — Anthony Ayala Delgado
(74) *Attorney, Agent, or Firm* — Procopio, Cory, Hargreaves & Savitch LLP (57) ABSTRACT

A rich-wait-time threshold value is set based on the NOx discharge amount per unit time discharged from an internal combustion engine. When the elapsed time, i.e. either the elapsed engine operation time since rich control was performed on a lean NOx trap catalyst device, or the elapsed engine operation time since the engine was started, becomes equal to or greater than the rich-wait-time threshold value, a determination that the rich control be started is added as a necessary condition for starting the rich control. Accord-
(Continued)

ingly, an exhaust gas purification system for an internal combustion engine, an internal combustion engine, and an exhaust gas purification method for an internal combustion engine are provided, with which the execution timing of the rich control for recovering the NOx occlusion capacity of the lean NOx trap catalyst device is rendered more appropriate, and thus NOx reduction is performed with little fuel consumption deterioration.

6 Claims, 3 Drawing Sheets (51) Int. Cl.
*F01N 3/08* (2006.01)
*F01N 3/20* (2006.01)
*F01N 9/00* (2006.01)
*F01N 3/031* (2006.01)
*F01N 3/035* (2006.01)
*F01N 3/18* (2006.01)
*B01D 53/94* (2006.01)

(52) U.S. Cl.
CPC ......... *F01N 3/0814* (2013.01); *F01N 3/0842* (2013.01); *F01N 3/0871* (2013.01); *F01N 3/18* (2013.01); *F01N 3/20* (2013.01); *F01N 3/36* (2013.01); *F01N 9/00* (2013.01); *B01D 53/94* (2013.01); *F01N 2560/026* (2013.01); *F01N 2900/04* (2013.01); *F01N 2900/0412* (2013.01); *F01N 2900/08* (2013.01); *F01N 2900/1404* (2013.01); *F01N 2900/1614* (2013.01); *Y02T 10/24* (2013.01); *Y02T 10/47* (2013.01)

(58) Field of Classification Search
CPC ..... F01N 2900/1404; F01N 2900/1614; F01N 3/0253; F01N 3/031; F01N 3/035; F01N 3/08; F01N 3/0814; F01N 3/0842; F01N 3/0871; F01N 3/18; F01N 3/20; F01N 3/36; F01N 9/00
See application file for complete search history.

(56) References Cited

U.S. PATENT DOCUMENTS

2009/0077947 A1 3/2009 Nagaoka et al.
2017/0074190 A1* 3/2017 Lee .................. F02D 41/1441

FOREIGN PATENT DOCUMENTS

| JP | 2008-88926 A | 4/2008 |
| JP | 2013-253578 A | 12/2013 |
| JP | 2013253578 A * | 12/2013 |

OTHER PUBLICATIONS

Office Action for related CN App No. 201680010184.7 dated Jan. 31, 2019, 17 pgs.
International Search Report and Written Opinion for PCT App No. PCT/JP2016/052906 dated Apr. 26, 2016, 8 pgs.

* cited by examiner

EXHAUST GAS PURIFICATION SYSTEM FOR INTERNAL COMBUSTION ENGINE, INTERNAL COMBUSTION ENGINE, AND EXHAUST GAS PURIFICATION METHOD FOR INTERNAL COMBUSTION ENGINE

CROSS-REFERENCE TO RELATED APPLICATIONS

This application is a U.S. National Stage entry of PCT Application No. PCT/JP2016/052906, filed on Feb. 1, 2016, which claims priority to Japanese Patent Application No. 2015-027554, filed Feb. 16, 2015, the contents of which are incorporated herein by reference.

TECHNICAL FIELD

The present invention relates to an exhaust gas purification system of an internal combustion engine including an exhaust gas purification apparatus having a lean NOx trap catalyst device provided in an exhaust passage of the internal combustion engine, and more specifically, to an exhaust gas purification system of an internal combustion engine configured to optimize an implementation timing of rich reduction of a lean NOx trap catalyst device, an internal combustion engine and an exhaust gas purification method of an internal combustion engine.

BACKGROUND ART

In general, in order to purify purification target components such as hydrocarbon (HC), carbon monoxide (CO), nitrogen oxides (NOx), particulate matters (PM) and the like included in an exhaust gas of an internal combustion engine such as a Diesel engine, an exhaust gas purification system including an exhaust gas purification apparatus having each of catalyst devices such as an oxidation catalyst device (DOC), a particulate trap device (CSF, SCRF and the like), a selective reduction-type catalyst device (SCR), a lean NOx trap catalyst device (LNT) and the like has been used.

There is an exhaust gas purification system having a lean NOx trap catalyst device in the exhaust gas purification apparatus and configured to purify nitrogen oxides included in an exhaust gas. In the exhaust gas purification system for decreasing NOx, at a state (lean state) where oxygen is excessively included in the exhaust gas, like a lean burn engine and a Diesel engine, NOx is temporarily occluded in the lean NOx trap catalyst device, and when a NOx occlusion amount increases, NOx cannot be all occluded with the lean NOx trap catalyst device and thus a downward slip amount is likely to increase, the exhaust gas is periodically controlled to a rich air-fuel ratio, so that NOx occluded in the lean NOx trap catalyst device is discharged and reduced. The operations of occlusion, discharge and reduction are repeated, so that a NOx conversion efficiency by the lean NOx trap catalyst device is maintained.

In NOx regeneration processing of performing rich reduction of NOx occluded in the lean NOx trap catalyst device, as a trigger for shifting to the rich control, only two threshold values of an occlusion amount threshold value of NOx in the lean NOx trap catalyst device and a NOx concentration threshold value (or a NOx conversion efficiency threshold value), when a NOx concentration sensor is provided in an exhaust passage, are used. That is, when a NOx occlusion amount occluded in the lean NOx trap catalyst device becomes equal to or greater than a preset NOx occlusion amount threshold value and when a NOx concentration detected by the NOx concentration sensor becomes equal to or greater than a preset NOx concentration threshold value (in other words, the NOx conversion efficiency is equal to or less than a preset NOx conversion efficiency threshold value), the control is shifted to the rich control.

In this case, however, since the control is shifted to the rich control, irrespective of an operating pattern of the engine, the control may be shifted to the rich control of the exhaust gas at a timing, which is not always optimal for improvement on the NOx conversion efficiency and fuel consumption. As a result, the NOx conversion efficiency and fuel consumption are not stable.

For example, even when the NOx occlusion amount is equal to or greater than the NOx occlusion amount threshold value and the conversion efficiency is lower than the NOx conversion efficiency threshold value, if the operating state of the engine is a low-speed and low-load state, the NOx discharge amount is low, so that the control is not necessarily required to be shifted to the rich control. However, the control is shifted to the rich control under current control.

Regarding the above problem, as disclosed in Japanese Patent Application Publication No. 2002-81335A, an exhaust purification apparatus of an internal combustion engine has been suggested which has a function of narrowing an operation region of a lean air-fuel ratio upon acceleration operation of the engine when a relation between a total NOx discharge amount and a traveling time period of the vehicle lies on a total exhaust amount increase-side higher than a predetermined relation, considering that a regulated value by NOx discharge regulation is a total NOx discharge amount with respect to a predetermined traveling distance, and which is configured to effectively suppress the total NOx discharge amount and to effectively recover NOx occlusion performance by increasing an opportunity of NOx reduction.

In the above exhaust purification apparatus of an internal combustion engine, it is controlled whether or not to allow the lean operation in which the NOx discharge amount increases upon the acceleration operation of the engine. Thereby, when there is a margin in the total discharge amount by the relation between the total NOx discharge amount and the traveling time period of the vehicle, the operation by the lean air-fuel ratio is allowed even during the acceleration operation, so that the fuel consumption is improved and the total NOx discharge amount is managed.

CITATION LIST

Patent Literature

PTL 1: Japanese Patent Application Publication No. 2002-81335A

SUMMARY OF INVENTION

Technical Problem

The inventors found a following. As a traveling pattern of a vehicle, for example, when a vehicle accelerates after traveling at low speed, only NOx occlusion is performed without performing the lean rich control for the lean NOx trap catalyst device while the vehicle travels at low load and a NOx discharge amount per unit time discharged from the engine is small. After that, when the rich control is performed as the vehicle accelerates and a temperature of the exhaust gas increases, the NOx reduction efficiency is improved and NOx can be reduced by the short-time rich control with little deterioration in fuel consumption.

Also, the inventors found a following. When the temperature of the exhaust gas increases, the NOx discharge amount per unit time discharged from the engine increases. Therefore, it is possible to catch a increase timing of the temperature of the exhaust gas by the increase and decrease in the NOx discharge amount per unit time.

The present invention has been made in view of the above situations, and an object thereof is to provide an exhaust gas purification system of an internal combustion engine having a lean NOx trap catalyst device provided in an exhaust passage of the internal combustion engine, and capable of rendering an implementation timing of a rich control for recovering a NOx occlusion capacity of the lean NOx trap catalyst device more appropriate and performing NOx reduction by the short-time rich control of excellent NOx reduction efficiency, with little deterioration in fuel consumption, an internal combustion engine and an exhaust gas purification method of an internal combustion engine.

Solution to Problem

In order to achieve the above object, an exhaust gas purification system of an internal combustion engine of the present invention is an exhaust gas purification system of an internal combustion engine including a lean NOx trap catalyst device provided in an exhaust passage of the internal combustion engine and a control device configured to perform a rich control for recovering a NOx occlusion capacity of the lean NOx trap catalyst device, wherein the control device includes NOx discharge amount calculating means for calculating a NOx discharge amount per unit time discharged from the internal combustion engine, rich-wait-time threshold value setting means for setting a rich-wait-time threshold value on the basis of the NOx discharge amount per unit time calculated by the NOx discharge amount calculating means, elapsed time determining means for determining to start the rich control when an elapsed time, which is an elapsed engine operation time after the rich control is performed on the lean NOx trap catalyst device or an elapsed engine operation time after the engine is started, becomes equal to or greater than the rich-wait-time threshold value set by the rich-wait-time threshold value setting means, and rich control means for starting the rich control by a command to start the rich control, and wherein rich control command means for commanding the rich control means to start the rich control is configured such that the determination of the elapsed time determining means that the rich control is to be started is a necessary condition for issuing the command.

According to the above configuration, when performing the rich control of enriching the air-fuel ratio of the exhaust gas and discharging and reducing NOx occluded in the lean NOx trap catalyst device, as a trigger of the rich control start, a trigger of the rich-wait-time threshold value calculated on the basis of the NOx discharge amount per unit time discharged from the engine is added to the triggers that have been used in the related art. As a result, even at a state where the trigger conditions of the related art are satisfied, it is determined whether it is necessary to immediately perform the rich control and whether to further extend the rich control by the NOx discharge amount upon the control, i.e., considering an engine operating state and a traveling mode, so that the implementation timing of the rich control for recovering the NOx occlusion capacity of the lean NOx trap catalyst device can be rendered more appropriate and NOx reduction can be performed by the short-time rich control of excellent NOx reduction efficiency, with little deterioration in fuel consumption.

Also, in the exhaust gas purification system of an internal combustion engine, the control device includes NOx occlusion amount determining means for calculating a NOx occlusion amount occluded in the lean NOx trap catalyst device and determining to start the rich control when the NOx occlusion amount becomes equal to or greater than a preset NOx occlusion amount threshold value, and NOx conversion efficiency determining means for calculating a NOx conversion efficiency purified in the lean NOx trap catalyst device and determining to start the rich control when the NOx conversion efficiency becomes equal to or less than a preset NOx conversion efficiency threshold value, and when the rich control command means is configured to issue the command to start the rich control on condition that the three start determinations of determination of the NOx occlusion amount determining means that the rich control is to be started, the determination of the NOx conversion efficiency determining means that the rich control is to be started and the determination of the elapsed time determining means that the rich control is to be started coincide, since the rich control is started on the basis of the three parameters of the NOx occlusion amount, the NOx conversion efficiency and the NOx discharge amount, it is possible to further optimize the implementation timing of the rich control of the lean NOx trap catalyst device.

Also, in the exhaust gas purification system of an internal combustion engine, when the rich-wait-time setting means is configured such that the rich-wait-time threshold value is set to decrease as the NOx discharge amount per unit time calculated by the NOx discharge amount calculating means increases, it is possible to more appropriately set the rich-wait-time threshold value relating to the rich control of the lean NOx trap catalyst device.

Also, an internal combustion engine of the present invention for achieving the above object includes the exhaust gas purification system of an internal combustion engine, so that it is possible to accomplish the same operational effects as the exhaust gas purification system of an internal combustion engine.

Also, an exhaust gas purification method of an internal combustion engine of the present invention for achieving the above object is an exhaust gas purification method of an internal combustion engine having a lean NOx trap catalyst device provided in an exhaust passage of the internal combustion engine and configured to perform rich control for recovering a NOx occlusion capacity of the lean NOx trap catalyst device. The method includes, when determining start of the rich control, setting a rich-wait-time threshold value on the basis of a NOx discharge amount per unit time discharged from the internal combustion engine and adding a determination that the rich control is to be started when an elapsed time, which is an elapsed engine operation time after the rich control is performed on the lean NOx trap catalyst device or an elapsed engine operation time after the engine is started, becomes equal to or greater than the rich-wait-time threshold value, wherein the determination that the rich control is to be started is set as a necessary condition for starting the rich control.

Also, in the exhaust gas purification method of an internal combustion engine, the rich control is started when three conditions that a NOx occlusion amount occluded in the lean NOx trap catalyst device is calculated and the NOx occlusion amount becomes equal to or greater than a preset NOx occlusion amount threshold value, that a NOx conversion efficiency purified in the lean NOx trap catalyst device is calculated and the NOx conversion efficiency becomes equal to or less than a preset NOx conversion efficiency and that the elapsed time becomes equal to or greater than the rich-wait-time threshold value are satisfied.

According to the method, it is possible to accomplish the same operational effects as the exhaust gas purification system of an internal combustion engine.

Advantageous Effects of Invention

According to the exhaust gas purification system of an internal combustion engine, the internal combustion engine and the exhaust gas purification method of an internal combustion engine of the present invention, in the exhaust gas purification system of an internal combustion engine having the lean NOx trap catalyst device provided in the exhaust passage of the internal combustion engine, it is possible to render the implementation timing of the rich control for recovering the NOx occlusion capacity of the lean NOx trap catalyst device more appropriate, so that it is possible to perform NOx reduction by the short-time rich control of excellent NOx reduction efficiency, with little deterioration in fuel consumption.

DESCRIPTION OF EMBODIMENTS

Hereinafter, an exhaust gas purification system of an internal combustion engine, an internal combustion engine and an exhaust gas purification method of an internal combustion engine in accordance with an illustrative embodiment of the present invention will be described with reference to the drawings. In the meantime, the internal combustion engine in accordance with an illustrative embodiment of the present invention includes an exhaust gas purification system of an internal combustion engine in accordance with an illustrative embodiment of the present invention and can express the same operational effects that are to be accomplished by the exhaust gas purification system of an internal combustion engine, which will be described later.

First, an internal combustion engine (hereinafter, referred to as 'engine') 10 and an exhaust gas purification system 20 of an internal combustion engine in accordance with an illustrative embodiment of the present invention are described with reference to FIG. 1. The engine 10 is provided with a fuel injection device 11, and intake valve 12 and an exhaust valve 13, which face towards a cylinder 10*a*, an intake passage 14 configured to communicate with the intake valve 12, an exhaust passage 15 configured to communicate with the exhaust valve 13, and an EGR passage 16.

The intake passage 14 is provided with an air cleaner 17, a compressor 18*b* of a turbo charger (a turbo supercharger), an intercooler 19*a*, and an intake throttle valve 19 in corresponding order from an upstream side, and the exhaust passage 15 is provided with a turbine 18*a* of the turbo charger 18 and an exhaust gas purification apparatus 21 in corresponding order from an upstream side. Also, the EGR passage 16 is provided by connecting the intake passage 14 positioned further downstream than the compressor 18*b* and the exhaust passage 15 positioned further upstream than the turbine 18*a*, and the EGR passage 16 is provided with an EGR cooler 16*a* and an EGR valve 16*b* in corresponding order from an upstream side.

A fresh air A that is introduced from the atmosphere is sent to the cylinder 10*a* via the intake valve 12 with being accompanied by an exhaust gas (EGR gas) Ge, which is to flow from the EGR passage 16 into the intake passage 14, as required. Also, an exhaust gas G generated from the cylinder 10*a* outflows to the exhaust passage 15 via the exhaust valve 13, and a part thereof flows to the EGR passage 16, as the EGR gas Ge and the remaining exhaust gas Ga (=G−Ge) is introduced into the exhaust gas purification apparatus 21 via the turbine 18*a*, is purified and is discharged to the atmosphere via a muffler (not shown) and a tail pipe (not shown), as a purified exhaust gas Gc.

Figure 1:
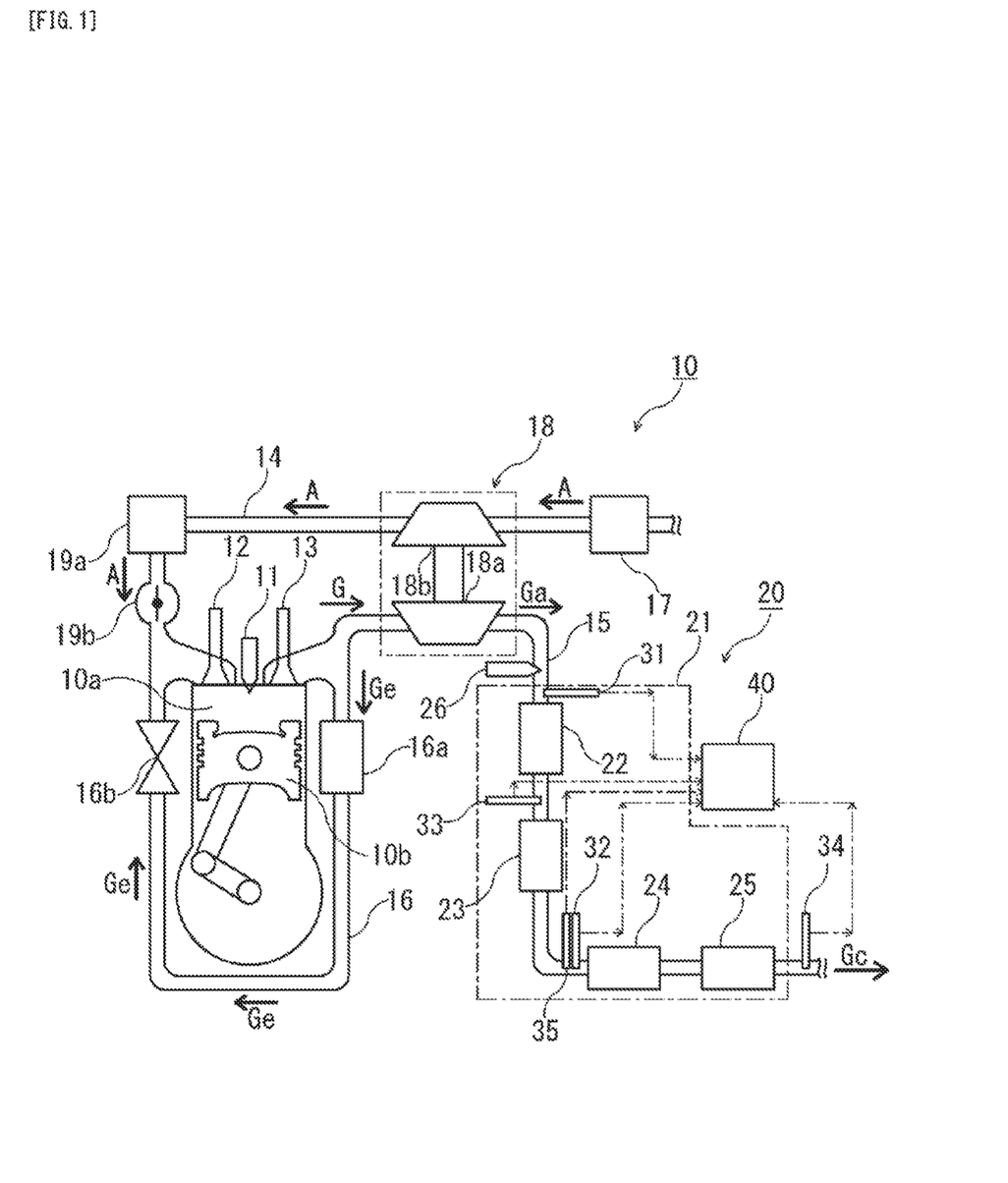
FIG. 1 pictorially depicts a configuration of an internal combustion engine having an exhaust gas purification system of an internal combustion engine in accordance with an illustrative embodiment of the present invention.

Also, in the configuration of FIG. 1, the exhaust gas purification apparatus 21 of the exhaust gas purification system 20 includes catalyst devices such as an oxidation catalyst device (DOC) 22, a particulate trap device (CSF) 23, a lean NOx trap catalyst device (LNT) 24, a rear end oxidation catalyst device (DOC) 25 and the like. In the meantime, the particulate trap device 23 and the lean NOx trap catalyst device 24 may be arranged in a reverse order, i.e., the exhaust gas purification apparatus 21 may be provided with the catalyst devices in order of the oxidation catalyst device 22, the lean NOx trap catalyst device 24, the particulate trap device 23 and the rear end oxidation catalyst device 25.

Also, the exhaust passage 15 upstream of the oxidation catalyst device 22 is arranged with a fuel injection device 26 configured to inject unburnt fuel into the exhaust passage 15. The fuel injection device injects unburnt fuel into the exhaust passage 15 when controlling a temperature rising of the exhaust gas, such as rich control (NOx regeneration control) on the lean NOx trap catalyst device 24, sulfur purge control on the oxidation catalyst device 22 and the lean NOx trap catalyst device 24, PM regeneration control on the particulate trap device 23, and the like.

By the injection, hydrocarbon, which is unburnt fuel, is oxidized in the oxidation catalyst device 22 and the like, and the temperature of the exhaust gas Ga is increased by the oxidation heat. By the increase in temperature of the exhaust gas Ga and the increase in temperature due to combustion of hydrocarbon in the respective catalyst devices 22, 23, 24, a temperature of the lean NOx trap catalyst device 24 is increased to a temperature region of discharge and reduction of occluded NOx, a temperature of the particulate trap device 23 is increased to a temperature region in which PM can be combusted or temperatures of the oxidation catalyst device 22 and the lean NOx trap catalyst device 24 are increased to a temperature region in which desulfurization can be made. Thereby, an exhaust gas purification capacity of each of the catalyst devices 22, 23, 24 is recovered.

Also, the exhaust passage 15 upstream (inlet-side) of the oxidation catalyst device 22 is arranged with a first temperature sensor 31 configured to detect a temperature of the exhaust gas Ga to be introduced into the oxidation catalyst device 22, the exhaust passage 15 upstream of the lean NOx trap catalyst device 24 is arranged with a second temperature sensor 32 configured to detect a temperature of the exhaust gas Ga to be introduced into the lean NOx trap catalyst device 24, and the exhaust passage 15 between the oxidation catalyst device 22 and the particulate trap device 23 is arranged with a third temperature sensor 33 configured to detect a temperature of the exhaust gas Ga to outflow from the oxidation catalyst device 22 and to be introduced into the particulate trap device 23.

Also, a λ sensor 34 or an oxygen concentration sensor (not shown) configured to measure an air excess ratio λ or an oxygen concentration of the exhaust gas Ga is arranged downstream of the exhaust gas purification apparatus 21. The λ sensor or the oxygen concentration sensor may be arranged upstream of the exhaust gas purification apparatus 21 or may be arranged at an exhaust manifold.

Also, the exhaust passage 15 upstream of the lean NOx trap catalyst device 24 is arranged with a NOx concentration sensor 35 configured to detect a NOx concentration D of the exhaust gas Ga to be introduced into the lean NOx trap catalyst device 24. In the meantime, when the NOx concentration D of the exhaust gas Ga to be introduced into the lean NOx trap catalyst device 24 can be estimated by any method of the related art, the NOx concentration sensor 35 is not necessarily required to be arranged.

Also, a control device 40 configured to control the exhaust gas purification system 20 of an internal combustion engine of the present invention is provided. The control device 40 is normally incorporated into an engine control unit (ECU) configured to control an entire operating state of the engine 10 but may be independently provided.

Figure 2:
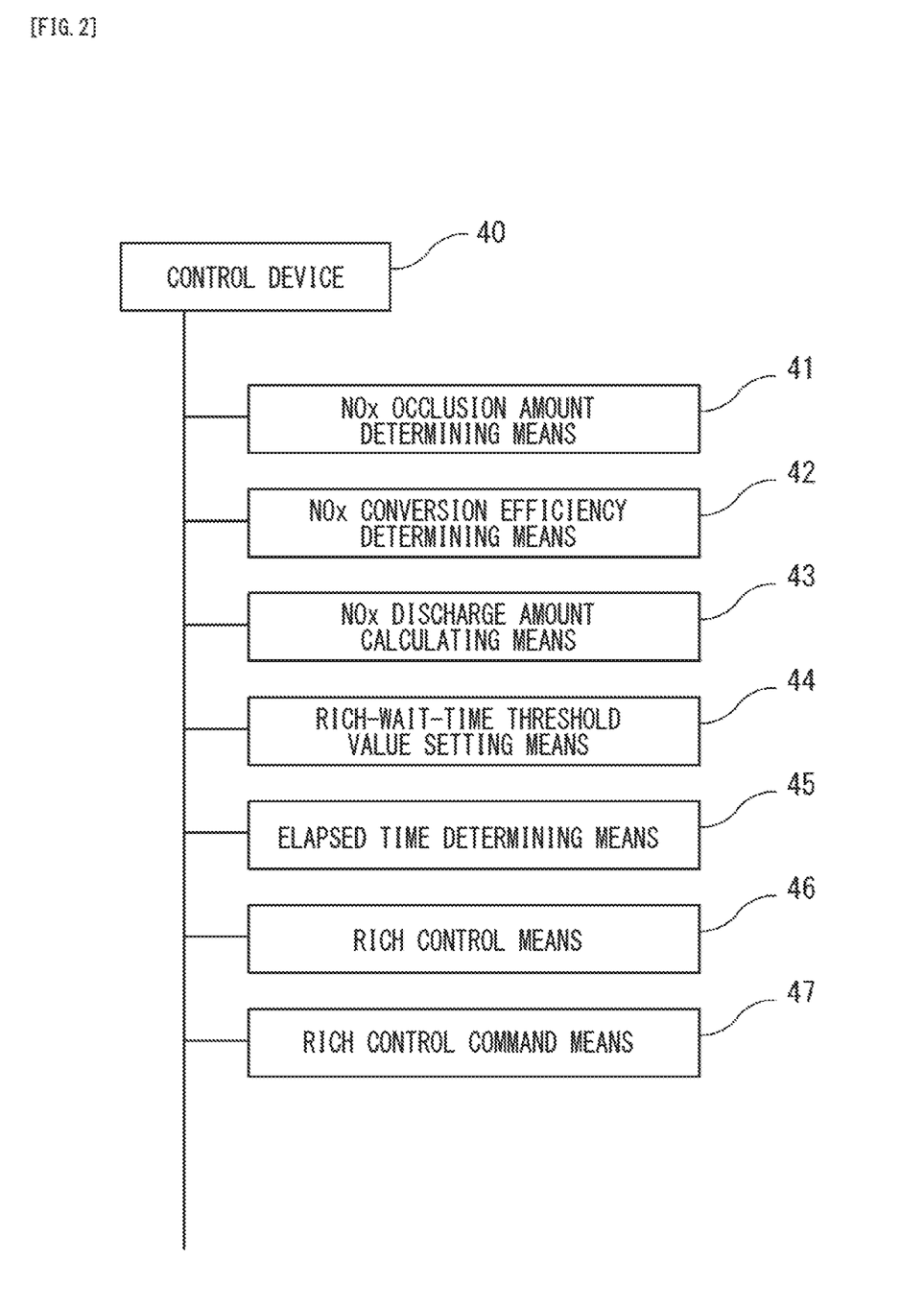
FIG. 2 depicts a configuration of a control device.

In the exhaust gas purification system 20 of an internal combustion engine in accordance with the illustrative embodiment of the present invention, as shown in FIG. 2, the control device 40 configured to control the exhaust gas purification system 20 includes a NOx occlusion amount determining means 41, a NOx conversion efficiency determining means 42, a NOx discharge amount calculating means 43, a rich-wait-time threshold value setting means 44, an elapsed time determining means 45, a rich control means 46, a rich control command means 47 and the like, and is configured to perform rich control for recovering a NOx occlusion capacity of the lean NOx trap catalyst device 24.

The NOx occlusion amount determining means 41 is a means for calculating a NOx occlusion amount occluded in the lean NOx trap catalyst device 24 and determining to start the rich control when the NOx occlusion amount becomes equal to or greater than a preset NOx occlusion amount threshold value. Also, the NOx conversion efficiency determining means 42 is a means for calculating a NOx conversion efficiency purified in the lean NOx trap catalyst device 24 and determining to start the rich control when the NOx conversion efficiency becomes equal to or less than a preset NOx conversion efficiency threshold value, and is a well-known means.

Also, the NOx discharge amount calculating means 43 is a means for calculating a NOx discharge amount W per unit time discharged from the engine 10, and the rich-wait-time threshold value setting means 44 is a means for setting a rich-wait-time threshold value tc on the basis of the NOx discharge amount W per unit time calculated by the NOx discharge amount calculating means 43.

Figure 3:
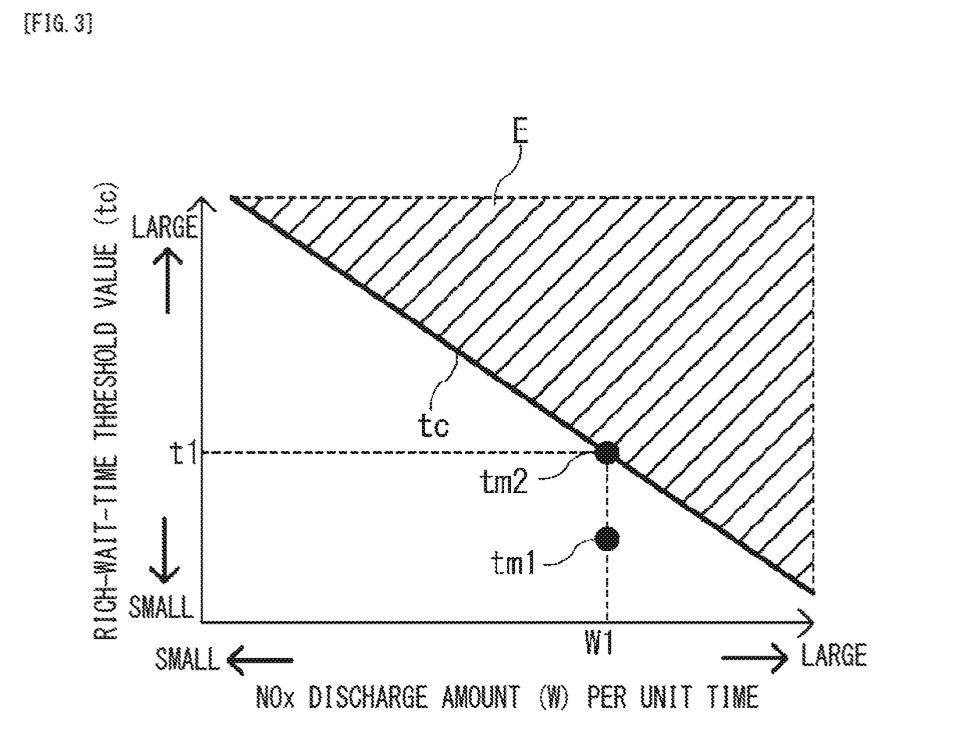
FIG. 3 pictorially depicts a relation between a NOx discharge amount per unit time from an internal combustion engine and a rich-wait-time threshold value.

As shown in FIG. 3, the rich-wait-time threshold value setting means 44 sets the rich-wait-time threshold value tc to decrease as the NOx discharge amount W per unit time calculated by the NOx discharge amount calculating means 43 increases. That is, the rich-wait-time threshold value tc is converted into map data on the basis of the NOx discharge amount W per unit time or the rich-wait-time threshold value tc is made as a function of the NOx discharge amount W per unit time. Thereby, for example, as shown in FIG. 3, when a NOx discharge amount W1 per unit time is input, time t1 corresponding to the NOx discharge amount W1 per unit time is calculated and output as the rich-wait-time threshold value tc.

Meanwhile, in FIG. 3, when an elapsed time tm1 reaches a rich control implementation region E shown with oblique lines and becomes time tm2, i.e., when the elapsed time tm1 becomes equal to or greater than the rich-wait-time threshold value t1, the rich reduction control on the lean NOx trap catalyst device 24 is performed, and when the elapsed time tm1 does not reach the oblique line region E, i.e., when the elapsed time tm1 is less than the rich-wait-time threshold value t1, the rich reduction control on the lean NOx trap catalyst device 24 is not performed.

Meanwhile, in FIG. 3, the correlation between the NOx discharge amount W per unit time from the engine 10 and the rich reduction-wait-time threshold value t is set in advance by a test and the like and exhibits a negatively-sloped line relation. However, the linear relation of FIG. 3 is just exemplary and may also be a lower left convex curve relation or an upper right convex curve relation.

Also, the NOx discharge amount W per unit time from the engine 10 is obtained by calculating a flow rate of the exhaust gas on the basis of a NOx concentration D detected by the NOx concentration sensor 35 provided at a front end of the lean NOx trap catalyst device 24 or a NOx concentration D estimated by any method of the related art, a flow rate of an intake air, a circulation amount of the EGR gas and an amount of fuel consumption, calculating an instant NOx amount included in the exhaust gas and converting the calculated NOx amount into an amount per unit time (for example, per one hour) by the control device such as the ECU (engine control unit), for example. In the meantime, preferably, the NOx discharge amount W is obtained by taking a moving average for some time until a steady state and calculating an average value of the NOx discharge amounts W from moment to moment, rather than the instant value upon control.

The elapsed time determining means 45 is a means for determining to start the rich control when an elapsed time t, which is an elapsed engine operation time after the rich control is performed on the lean NOx trap catalyst device 24 or an elapsed engine operation time after the engine is started, becomes equal to or greater than the rich-wait-time threshold value tc set by the rich-wait-time threshold value setting means 44.

The elapsed time t is time corresponding to the rich-wait-time threshold value tc, and is a count value counted by the control device such as the ECU (engine control unit) after the previous rich control on the lean NOx trap catalyst device 24 or from the start of the engine 10.

In the meantime, usually, the rich reduction control on the lean NOx trap catalyst device 24 is not performed until preset rich reduction inhibition time (for example, 10 to 30 minutes) elapses from the start of the engine 10. Therefore, the rich reduction-wait-time threshold value tc is set as a value exceeding the rich reduction inhibition time.

Also, the rich control means 46 is a means for starting the rich control by a command to start the rich control, and the rich control command means 47 is a means for commanding the rich control means 46 to start the rich control.

In the present invention, the rich control command means 47 is configured such that the determination of the elapsed time determining means 45 that the rich control is to be started is set as a necessary condition for issuing the command. Further, the rich control command means 47 is configured to issue the command to start the rich control when three start determinations of determination of the NOx occlusion amount determining means 41 that the rich control is to be started, the determination of the NOx conversion efficiency determining means 41 that the rich control is to be started and the determination of the elapsed time determining means 45 that the rich control is to be started coincide.

An exhaust gas purification method of an internal combustion engine in accordance with the illustrative embodiment of the present invention is an exhaust gas purification method of an internal combustion engine having the lean NOx trap catalyst device 24 provided in the exhaust passage 15 of the engine 10 and configured to perform the rich control for recovering a NOx occlusion capacity of the lean NOx trap catalyst device 24. The method includes, when determining start of the rich control, setting the rich-wait-time threshold value tc on the basis of the NOx discharge amount W per unit time discharged from the engine 10 and adding the determination that the rich control is to be started when the elapsed time t, which is the elapsed engine operation time after the rich control is performed on the lean NOx trap catalyst device 24 or the elapsed engine operation time after the engine is started, becomes equal to or greater than the rich-wait-time threshold value 5c, wherein the determination that the rich control is to be started is set as a necessary condition for starting the rich control.

Also, in the method, the rich control is started when three conditions that a NOx occlusion amount occluded in the lean NOx trap catalyst device 24 is calculated and the NOx occlusion amount becomes equal to or greater than a preset NOx occlusion amount threshold value, that a NOx conversion efficiency purified in the lean NOx trap catalyst device 24 is calculated and the NOx conversion efficiency becomes equal to or less than a preset NOx conversion efficiency and that the elapsed time t, which is the elapsed engine operation time after the rich control is performed on the lean NOx trap catalyst device 24 or the elapsed engine operation time after the engine is started, becomes equal to or greater than the rich-wait-time threshold value tc are satisfied.

According to the exhaust gas purification system 20 of an internal combustion engine, the internal combustion engine 10 and the exhaust gas purification method of an internal combustion engine, when performing the rich control of enriching the air-fuel ratio of the exhaust gas Ga and discharging and reducing NOx occluded in the lean NOx trap catalyst device 24, as a trigger of the rich control start, a trigger of the rich-wait-time threshold value tc calculated on the basis of the NOx discharge amount W per unit time discharged from the engine is added to the triggers that have been used in the related art. As a result, even at a state where the trigger conditions of the related art are satisfied, it is determined whether it is necessary to immediately perform the rich control and whether to further extend the rich control by the NOx discharge amount W upon the control, i.e., considering an engine operating state and a traveling mode, so that the implementation timing of the rich control for recovering the NOx occlusion capacity of the lean NOx trap catalyst device 24 can be rendered more appropriate.

Also, since the rich control is started on the basis of the three parameters of the NOx occlusion amount, the NOx conversion efficiency and the NOx discharge amount, it is possible to further optimize the implementation timing of the rich control of the lean NOx trap catalyst device 24.

Therefore, in the exhaust gas purification system of an internal combustion engine 20 having the lean NOx trap catalyst device 24 provided in the exhaust passage 15 of the engine 10, it is possible to render the implementation timing of the rich control for recovering the NOx occlusion capacity of the lean NOx trap catalyst device 24 more appropriate, so that it is possible to perform NOx reduction by the short-time rich control of excellent NOx reduction efficiency, with little deterioration in fuel consumption.

REFERENCE SIGNS LIST

10: engine (internal combustion engine)
11: fuel injection device
15: exhaust passage
20: exhaust gas purification system
21: exhaust gas purification apparatus
22: oxidation catalyst device (DOC)
23: particulate trap device
24: selective reduction-type catalyst device (SCR)
25: rear end oxidation catalyst device (DOC)
26: fuel injection device
31: first temperature sensor
32: second temperature sensor
33: third temperature sensor
34: λ sensor
35: NOx concentration sensor
40: control device
41: NOx occlusion amount determining means
42: NOx conversion efficiency determining means
43: NOx discharge amount calculating means
44: rich-wait-time threshold value setting means
45: elapsed time determining means
46: rich control means
47: rich control command means
A: fresh air
G: generated exhaust gas
Ga: exhaust gas to pass exhaust gas purification apparatus
Gc: purified exhaust gas
Ge: EGR gas

The invention claimed is:

1. An exhaust gas purification system of an internal combustion engine comprising a lean NOx trap catalyst device provided in an exhaust passage of the internal combustion engine and a control device configured to perform a rich control for recovering a NOx occlusion capacity of the lean NOx trap catalyst device,
    wherein the control device is configured to:
        calculate a NOx discharge amount per unit time discharged from the internal combustion engine;
        calculate a NOx occlusion amount occluded in the lean NOx trap catalyst device;
        calculate a NOx conversion efficiency purified in the lean NOx trap catalyst device;
        set a rich-wait-time threshold value on the basis of the calculated NOx discharge amount per unit time; and
        determine an elapsed time, which is an elapsed engine operation time after the rich control is performed on the lean NOx trap catalyst device or an elapsed engine operation time after the engine is started,
    wherein the control device is further configured to start the rich control when the elapsed time becomes equal to or greater than the rich-wait-time threshold value and when at least one of (i) the NOx occlusion amount becomes equal to or greater than a preset NOx occlusion amount threshold value and (ii) the NOx conversion efficiency becomes equal to or less than a preset NOx conversion efficiency threshold value.

2. The exhaust gas purification system of the internal combustion engine according to claim 1,
    wherein the control device is further configured to start the rich control, when the elapsed time becomes equal to or greater than the rich-wait-time threshold value, the NOx occlusion amount becomes equal to or greater than a preset NOx occlusion amount threshold value, and the NOx conversion efficiency becomes equal to or less than a preset NOx conversion efficiency threshold value.

3. The exhaust gas purification system of the internal combustion engine according to claim 1, wherein in the setting of the rich-wait-time threshold value, the rich-wait-time threshold value is set to decrease as the NOx discharge amount per unit time increases.

4. An exhaust gas purification method of an internal combustion engine having a lean NOx trap catalyst device provided in an exhaust passage of the internal combustion engine and configured to perform rich control for recovering a NOx occlusion capacity of the lean NOx trap catalyst device, the method comprising:

calculating a NOx occlusion amount occluded in the lean NOx trap catalyst device;

calculating a NOx conversion efficiency purified in the lean NOx trap catalyst device;

setting a rich-wait-time threshold value on the basis of a NOx discharge amount per unit time discharged from the internal combustion engine;

determining an elapsed time, which is an elapsed engine operation time after the rich control is performed on the lean NOx trap catalyst device or an elapsed engine operation time after the engine is started, and     starting the rich control when an elapsed time becomes equal to or greater than the rich-wait-time threshold value and when at least one of (i) the NOx occlusion amount becomes equal to or greater than a preset NOx occlusion amount threshold value and (ii) the NOx conversion efficiency becomes equal to or less than a preset NOx conversion efficiency threshold value.

5. The exhaust gas purification method of the internal combustion engine according to claim 4, wherein the rich control is started when     the NOx occlusion amount occluded in the lean NOx trap catalyst device is calculated and the NOx occlusion amount becomes equal to or greater than a preset NOx occlusion amount threshold value,     the NOx conversion efficiency purified in the lean NOx trap catalyst device is calculated and the NOx conversion efficiency becomes equal to or less than a preset NOx conversion efficiency, and     the elapsed time becomes equal to or greater than the rich-wait-time threshold value are satisfied.

6. The exhaust gas purification method of the internal combustion engine according to claim 4, wherein the rich control is not started, in a case where the NOx occlusion amount becomes equal to or greater than a preset NOx occlusion amount threshold value and the NOx conversion efficiency becomes equal to or less than a preset NOx conversion efficiency threshold value, but the elapsed time does not becomes equal to or greater than the set rich-wait-time threshold value set by the control device.

\* \* \* \* \*